(12) United States Patent
Yang et al.

(10) Patent No.: US 11,745,101 B2
(45) Date of Patent: Sep. 5, 2023

(54) TOUCH MAGNITUDE IDENTIFICATION AS INPUT TO GAME

(71) Applicant: Sony Interactive Entertainment Inc., Tokyo (JP)

(72) Inventors: Yiwei Yang, San Mateo, CA (US); Alvin Daniel, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 5 days.

(21) Appl. No.: 17/472,631

(22) Filed: Sep. 11, 2021

(65) Prior Publication Data

US 2023/0081537 A1    Mar. 16, 2023

(51) Int. Cl.
*A63F 13/2145* (2014.01)
*A63F 13/218* (2014.01)
*A63F 13/422* (2014.01)

(52) U.S. Cl.
CPC .......... *A63F 13/422* (2014.09); *A63F 13/218* (2014.09); *A63F 13/2145* (2014.09); *A63F 2300/1056* (2013.01); *A63F 2300/1075* (2013.01)

(58) Field of Classification Search
None
See application file for complete search history.

(56) References Cited

U.S. PATENT DOCUMENTS

| | | | |
|---|---|---|---|
| 10,078,410 B1* | 9/2018 | Isaak | G06F 3/048 |
| 2012/0038582 A1 | 2/2012 | Grant | |
| 2012/0169610 A1* | 7/2012 | Berkes | G06F 3/04166 345/173 |
| 2013/0217498 A1* | 8/2013 | Wang | A63F 13/06 463/37 |
| 2014/0004948 A1 | 1/2014 | Watkins et al. | |
| 2018/0021672 A1* | 1/2018 | Baba | A63F 13/54 463/31 |
| 2018/0188811 A1 | 7/2018 | Ullrich et al. | |
| 2020/0155941 A1* | 5/2020 | Ito | A63F 13/2145 |

OTHER PUBLICATIONS

"Force Touch", Wikipedia, retrieved on Aug. 3, 2021 from https://en.wikipedia.org/wiki/Force_Touch.
"Pressure Sensor", Wikipedia, retrieved on Aug. 3, 2021 from https://en.wikipedia.org/wiki/Pressure_sensor.
Azambuja, Enaie, "Lightweight touchscreen pressure sensor arrays", University of California, San Diego, Jan. 25, 2018.
"International Search Report and Written Opinion", dated Jan. 17, 2023, from the counterpart PCT application PCT/US22/76250.

* cited by examiner

*Primary Examiner* — Damon J Pierce
(74) *Attorney, Agent, or Firm* — John L. Rogitz; John M. Rogitz

(57) ABSTRACT

During execution of a video game or other interactive virtual content, a magnitude and/or amount of force applied to a touch-enabled surface may be used as input to the video game to take at least one action related to the video game's execution.

11 Claims, 2 Drawing Sheets

TOUCH MAGNITUDE IDENTIFICATION AS INPUT TO GAME

FIELD

The present application relates generally to using the magnitude of one or more touches to a touch-enabled surface as input to a video game or other interactive virtual content.

BACKGROUND

As recognized herein, many electronic video games are meant to be played with an electronic video game controller having many different buttons, joysticks, triggers, and other components that can be manipulated to play the video game. As also recognized herein, most of those components do not exist on mobile devices like smartphones. However, the disclosure below recognizes that it is still desirable to enable players to play such video games on mobile devices. There are currently no adequate solutions to the foregoing computer-related, technological problem.

SUMMARY

Accordingly, in one aspect a system includes at least one computer medium that is not a transitory signal and that includes instructions executable by at least one processor to identify a magnitude of touch input received at a touch-enabled display. The instructions are also executable to take at least one action related to execution of a video game in conformance with the identified magnitude.

In various example implementations, the instructions may be executable to identify the magnitude of touch input based on an identified size of a display area encompassing the touch input. Additionally, or alternatively, the magnitude of touch input may be identified based on input from at least one pressure sensor accessible to the at least one processor. The system may even include the at least one pressure sensor itself.

Then in conformance with the identified magnitude, in various examples the instructions may be executable to change an attack mode for a video game character from the video game, to change a weapon being used by a video game character from the video game, and/or to execute a particular attack via a video game character being played as part of the video game.

Additionally, or alternatively, in conformance with the identified magnitude, the instructions may be executable to move a video game character being played as part of the video game such that a first magnitude of touch input causes the video game character to move at a first speed and a second magnitude of touch input causes the video game character to move at a second speed faster than the first speed. The second magnitude may be greater than the first magnitude.

Further still, if desired and in conformance with the identified magnitude, in certain examples the instructions may be executable to present a video game character being played as part of the video game as having a particular emotion such that a first magnitude of touch input causes the video game character to visually demonstrate a first emotion and a second magnitude of touch input causes the video game character to visually demonstrate a second emotion different from the first emotion. The second magnitude may be different from the first magnitude, such as being greater than the first magnitude. The first emotion may be visually demonstrated through smiling and the second emotion may be visually demonstrated through laughter, for example.

Also in various example embodiments, the system may include the at least one processor and the touch-enabled display. Additionally, or alternatively, the system may include a server, and the touch-enabled display may be disposed on a device different from the server and with which the server communicates. In these examples, the instructions may then be executable to communicate, using the server, with the device to take the at least one action.

In another aspect, a method includes identifying an amount of force applied via touch input to a touch-enabled surface of a device. The method also includes taking at least one action related to execution of interactive virtual content based on the identified amount of force.

In various examples, the touch-enabled surface may include a touch-enabled display and/or a touch-enabled pad. Also in various examples, the interactive virtual content may include a video game.

Still further, if desired the method may include identifying two amounts of force applied via the touch input that are equal plus/minus a threshold amount. The two amounts of force may be determined to be applied while a body part providing the touch input continually touches the touch-enabled surface. In these examples, the method may then include, based on identifying the two amounts of force, taking at least one action related to execution of the interactive virtual content by executing a command associated with double-tap input and/or double-click input.

In still another aspect, a system includes at least one computer medium that is not a transitory signal and that includes instructions executable by at least one processor to identify an amount of force applied via touch input to a touch-enabled component of a device. The instructions are also executable to take at least one action related to execution of interactive virtual content based on the identified amount of force.

So, for example, the interactive virtual content may include a video game and the instructions may be executable to change a difficulty level associated with execution of the video game based on the identified amount of force. Thus, in certain example implementations the instructions may be executable to identify at least one emotion of a person playing the video game based on the identified amount of force and then change the difficulty level associated with execution of the video game based on the identification of the at least one emotion.

The details of the present application, both as to its structure and operation, can be best understood in reference to the accompanying drawings, in which like reference numerals refer to like parts, and in which:

DETAILED DESCRIPTION

Figure 1:
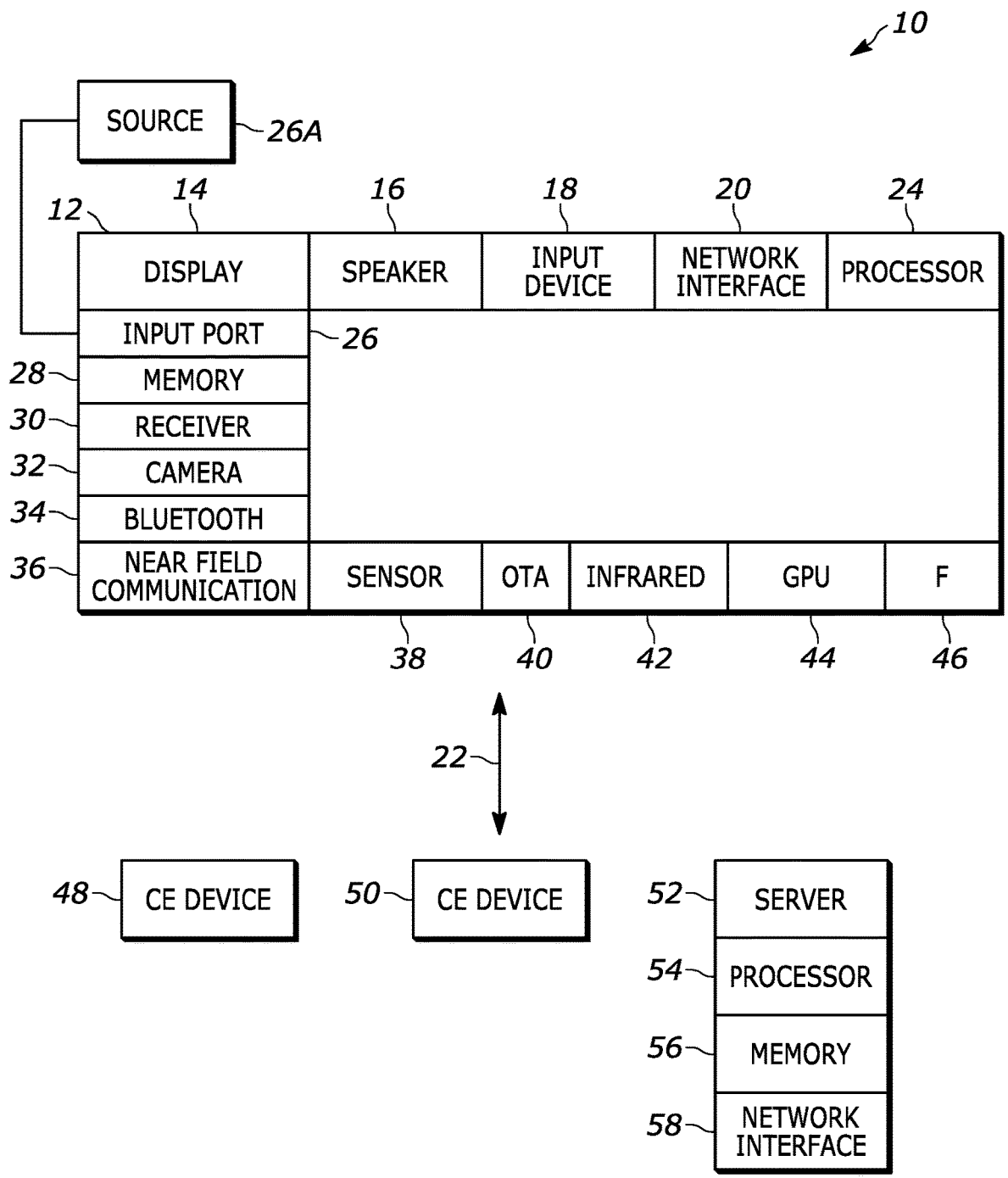
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage mediums 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command)) that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated and/or expanded, and UI elements may be mixed and matched between UIs.

With an example operating environment having been described, now suppose an end-user provides a command to his/her mobile device to begin executing a video game for the end-user to play via the mobile device (or to begin executing other virtual interactive content such as a virtual reality (VR) or augmented reality (AR) simulation). The mobile device may be, for example, a smartphone, tablet computer, convertible laptop computer usable as a tablet, or other device that might not have a hardware joystick, hardware triggers, and multiple dedicated hardware buttons for video game play. But notwithstanding, further note that present principles may still be implemented using other types of devices as well.

Figure 2:
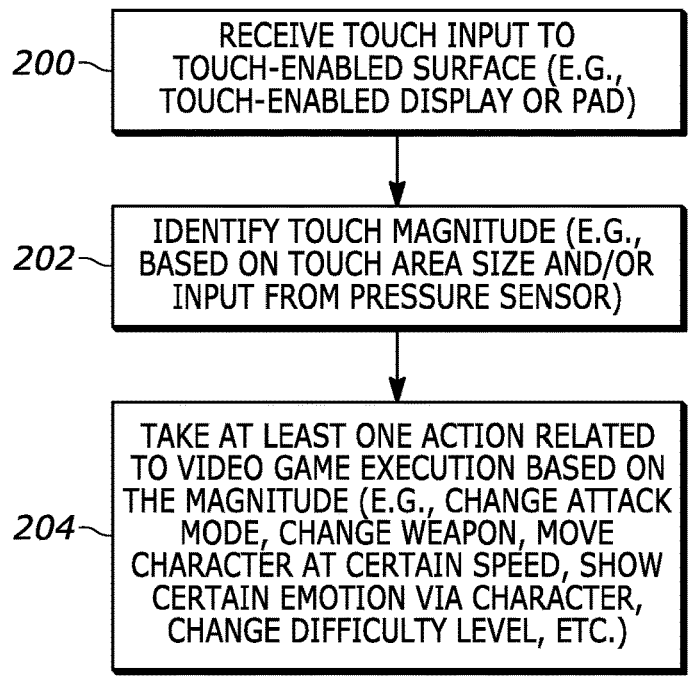
FIG. 2 illustrates example logic in example flow chart format that may be executed by a device to take a game action based on an identified amount of touch input force consistent with present principles.

In any case, responsive to receiving the command, the device may begin executing the video game and then present graphics of the video game on the device's touch-enabled display along with corresponding video game audio through one or more speakers on or connected to the mobile device. FIG. 2 thus shows a flow chart of ensuing example logic that may be executed by the mobile device or other end-user device while the video game is executing, either alone or in combination with another connected device such as a server and/or computer game console with which the end-user device might be communicating to execute and present the game consistent with present principles.

Beginning at block 200, the device may receive touch input to its touch-enabled display or other touch-enabled surface, such as a non-display touch pad on a laptop computer or even a touch pad on a video game controller. From block 200 the logic may then move to block 202.

At block 202 the device may identify a magnitude of the touch input and/or an amount of force applied to the surface of the touch-enabled display (or other touch-enabled surface) via the touch input. The magnitude and/or non-binary amount of force may be identified based on input from one or more one pressure sensors or force sensors in the touch-enabled display, for example. It is to therefore be understood that the pressure sensors may be located in a layer of the touch-enabled display on or beneath the outer surface of the display in order to sense an amount of pressure or force applied to the outer surface via the touch input. The pressure sensor(s) may be zinc oxide (ZnO)-based thin-film transistor (TFT) sensors, so-called "force touch" and "3D touch" sensors, or still other types of pressure sensors such as those already discussed above in reference to FIG. 1 (e.g., capacitive pressure sensors).

However, further note that the magnitude/amount of force applied to the surface of the touch-enabled display may additionally or alternatively be identified at block 202 based on an identified size of a display area encompassing the touch input. E.g., an area of the display (or other touch-enabled surface) that is touched by the user's finger may be identified using the display's touch sensors and then a relational database may be accessed that correlates area sizes or size ranges to various amounts of force in order to identify a particular amount of force from the database for a given touch input area. This approach to determining force may be used based on the understanding that presses of greater force can result in larger areas of the display being touched. Furthermore, note that in some examples an offset may be applied based on an average area size of touch inputs for a particular user, as already learned by the device based on a threshold number of past touch inputs for which corresponding display areas are averaged. The offset may then be used to normalize the area size reading for a given touch input from that user and then determine the corresponding touch force from the relational database.

From block 202 the logic may then proceed to block 204. At block 204 the device may take at least one action related to execution of the video game or other interactive virtual content based on the identified amount of force (e.g., may take a non-binary action). The various different actions that may be taken may be determined, e.g., using a relational database for the particular video game that is being executed. The relational database may be provided by the game's developer or the device's own manufacturer, for example, and may associate various amounts of force (or ranges of force) for one or more different respective game situations with various corresponding actions to take based on the respective amount of force.

For example, in conformance with the identified amount of force, the device may change an attack mode for a video game character or avatar from the video game. Thus, using the same weapon or weapon type, the user may vary attack modes between light/faint, medium, and heavy attack modes.

Additionally, or alternatively, in conformance with the identified amount of force, the device may change a weapon being used by the video game character or avatar so that, e.g., depending on how much force the end-user is applying to display, a more destructive or less destructive weapon may be wielded by the game character. As an example, a lighter touch may trigger the character to wield a pistol, while a heavier touch that is greater than a certain weapon-change threshold may trigger the character to wield a shotgun or high-powered rifle.

As yet another example, in conformance with the identified amount of force, the device may execute a particular attack or other move using the character or feign a particular attack or other move. For example, the device may feign attacks and other moves by the character while continual touch input remains below a threshold amount of force, and then execute the attack itself upon the user applying force above the threshold amount (and in some examples, for at least a threshold amount of time). Again, note that this sequence of force inputs may occur all while the touch input itself is continually applied to the display. Further note that this same touch input may also be used at the same time to move the character about in the virtual world as one might otherwise be able to do with a hardware joystick in order to control the direction of the attack itself. Thus, a single, continual, non-binary touch event to the touch-enabled surface may be used for both directionality input and attack input, where attacks may be feigned in one direction and then an actual attack executed in a slightly different direction if desired.

As another example involving feigning a particular game move, in the context of an e-sports basketball video game feigning may include a head-fake by a virtual character possessing the virtual basketball. In the context of an e-sports football game, feigning a particular move may include a virtual quarterback faking a short throw to a slot receiver (e.g., before actually throwing a deep ball down the sidelines to a wideout). In the context of an e-sports baseball game, feigning may include a virtual infielder faking a relay throw to home plate (e.g., before the infielder actually throws the virtual baseball to second or third base to try to get another runner out).

Providing still another example of an action the device may take at block 204, in conformance with the identified amount of force the device may move the video game character or avatar at different speeds, whether as part of travel (e.g., running or walking), part of attacking an opponent, or part of another game action. Thus, for example, a first magnitude of touch input may cause the video game character to move at a first speed and a second, greater magnitude of touch input may cause the video game character to move at a second speed that is faster than the first speed.

As yet another example of an action that may be taken at block 204, in conformance with the identified amount of force the device may present the video game character as having a particular emotion. Thus, for example, a first magnitude of touch input may cause the video game character to visually demonstrate a first emotion while a second, different magnitude of touch input may cause the video game character to visually demonstrate a second emotion different from the first emotion. E.g., a sliding but continual touch input in a first direction and at a first magnitude may command the device to visually demonstrate a happy emotion through the smiling of the game character while a sliding but continual touch input still in the same first direction but at a greater magnitude (e.g., above a threshold) may command the device to visually demonstrate an elated emotion through laughter of the game character.

Further still, note that in some cases an emotion of the end-user himself or herself may be identified from the force of the touch input and a game action may be taken accordingly. As an example, based on the identified amount of force, the device may identify at least one emotion of the end-user playing the video game (e.g., using a relational database associating various forces, and/or amounts of time of the applied forces, with various emotions). Then based on the identification of the at least one emotion, potentially in combination with emotion confirmation through facial recognition and other emotion-detection methods, the device might change the overall difficulty level associated with execution of the video game itself. For example, responsive to determining negative emotions from the force of the touch input, the device may decrease the difficulty level (or even provide other assistance to the user to play a certain level of the game even if the overall difficulty level remains the same). Likewise, responsive to determining positive emotions from the force of the touch input, the device may increase the difficulty level of the game. In this way, force-sensing at mobile devices may be used to avoid or reduce instances of "rage quit" and other negative user experiences while at the same time allow the user to play up to their ability if they are determined to be experiencing positive emotions through their force input.

However, further note that in other examples the device need not affirmatively identify a certain user emotion per se from the force of the input but may instead change the game's difficulty level based on the identified amount of force alone. For example, force above a first, upper threshold may be used to determine that a lower difficulty level is warranted and should be implemented, while force below a second, lower threshold may be used to determine that a higher difficulty level is warranted and should be implemented.

Proving yet another example of an action that the device may take at block 204, at block 202 the device may first identify two amounts of force applied via the touch input that are equal to each other, plus or minus a threshold amount. The device may also determine that the two amounts of force are applied within a threshold amount of time of each other and while a body part providing the touch input continually touches the touch-enabled surface itself (e.g., even if the display location of the touch input changes over time to control the directionality/movement of a game character). Then based on identifying the two amounts of force that are equal to within plus/minus the threshold amount, the device may execute a certain command associated with double-tap input and/or double-click input. For instance, the device may select a certain weapon for the user, open a certain file, or in a context outside of video games, launch a particular software application. This may be particularly helpful in the mobile context where display space might be limited and so hardware buttons and soft buttons can be eliminated to save screen space.

Figure 3:
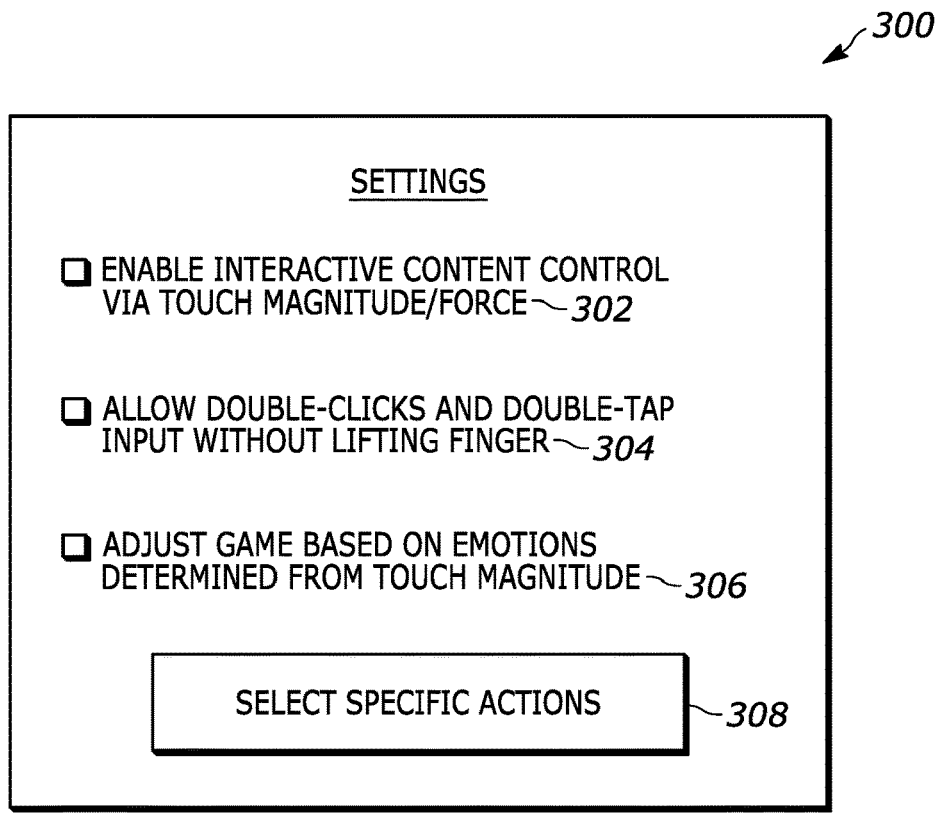
FIG. 3 shows an example graphical user interface (GUI) that may be presented to configure one or more settings of a system/device to operate consistent with present principles.

Continuing the detailed description in reference to FIG. 3, it shows an example graphical user interface (GUI) 300 that may be presented on the display of a mobile device or other device configured to operate consistent with present principles. The GUI 300 may be used to configure one or more settings related to force-based input processing consistent with present principles. In the example shown, each option on the GUI 300 may be selected by directing touch or cursor input to the respective check box adjacent to the respective option.

As shown in FIG. 3, the GUI 300 may include a first option 302 that may be selectable a single time to set or enable the device to, for multiple future instances of gameplay and/or game execution, execute the functions described above in reference to FIG. 2 and/or execute other functions described herein. The GUI 300 may also include a second option 304 that may be selectable to specifically set or enable the device to execute double-tap or double-click actions as discussed above based on continual touch input of a user's finger while two forces of an equal amount are applied at different times.

Additionally, if desired the GUI 300 may include another option 306 that may be selectable to set or enable the device to adjust game difficulty levels and potentially offer other assistance to a game player based on one or more emotions inferred from the magnitude of touch input as also described herein. Also, if desired, the GUI 308 may include a selector 308 that may be selectable via touch or cursor input to cause another GUI to be presented from which the user may select different respective game actions for the device to execute globally or for a given video game based on different amounts of force applied through touch input consistent with present principles.

Moving on from FIG. 3, it is to be understood that still other game actions than those described above may be executed based on an amount of force applied to a touch-enabled surface via an end-user's touch input. For instance, in terms of a race car game, progressively increasing force via touch input may control the car's throttle to propel the car faster and faster, while less force may be used to slow the car down or at least not accelerate it as fast. Thus, variable pressure over time, while still providing continual touch input without breaking contact with the touch-enabled surface, may be used to control how fast or slow the car goes.

In terms of e-sports games that involve use of a ball, different amounts of pressure applied to the touch surface can be translated into different actions, motions, and effects on the ball itself. For instance, the harder and longer a finger press before removing the finger from the touch surface, the more virtual energy or force the ball will be propelled with upon a "throw" command (which might be the effected by finger removal itself). Or for a basketball video game specifically, the basketball may be dribbled with increasing frequency and virtual force based on increased actual force applied to the touch surface by the user using his/her finger.

For a soccer video game, the distance and/or force with which a virtual soccer ball is kicked my similarly increase based on an increased actual force applied by the user to the touch surface. If desired, the kick "energy" may even build up over time as the actual force continues to be applied to the touch surface over time, thus increasing the force with which the soccer ball is ultimately kicked.

As another example, for an e-sports baseball game, the index and middle fingers may be concurrently applied to the touch surface but with the middle finger exerting more pressure than the index finger to mimic the action a pitcher would take to throw a curveball with more pressure on the middle finger. Thus, the greater the disparity between the pressure levels applied via the index and middle fingers, the greater the curve on the virtual curveball that is being thrown. The index and middle fingers themselves may be identified through camera images and object recognition, through fingerprint recognition, etc.

Also consistent with present principles, a virtual object presented as part of a video game or other virtual content may be pushed or nudged using touch input having pressure below a certain threshold and may be grabbed or picked up using touch input having pressure above the same threshold.

Furthermore, again note that other aspects of an avatar besides attack actions can be controlled through touch input of varying degrees of pressure. For example, fine-grain control and feedback for an avatar may be exacted through lighter touches than heavier touches. Likewise, increasingly heavier touches may result in incrementally more gross-grain control.

Pressure inputs might also be used to replicate analog triggers. For instance, the longer a touch input with a certain amount of pressure is applied to a touch-sensing surface, the more an attacking "flourish" may be manifested and sustained. Thus, in this example the shorter the touch input with the same amount of pressure, the faster, sharper, and quicker the attack might be. Different amounts of pressure might even be combined so that, for instance, a flourish attack is executed and as the user's finger pressure lightens (while still in continual contact with the surface) the attack may result in quicker, lighter strikes than the flourish portion of the attack. The attack might then end responsive to detection of the finger no longer contacting the touch-enabled surface.

In the context of musical video games, the amount of force applied to a touch surface may translate into a greater amount of force with which a virtual drum is struck by a virtual drummer, or the amount of pressure applied by a virtual guitar player to one or more virtual guitar strings to strum the guitar.

Still further, as discussed above the difficulty level of a video game may be adjusted based on an amount of force being applied. This might apply not just to increasing or decreasing the overall difficulty level of a game, game level, or game stage, but to also increasing or decreasing the difficulty level of performing various specific actions within the game or level. For instance, detection of increased finger pressure may be used infer that a certain action like hitting a target is too difficult for a certain user and the device may therefore increase the size of the target as presented on the device's display to make the target easier to hit. Likewise, auto-aiming and snap-to-aim may be made easier responsive to increased finger pressure. As another example in an adventure game, if the end-user's avatar keeps slipping and falling on a path and the user increases finger pressure to try to have the avatar remain upright on the path, the device may make the avatar's virtual walking path larger and/or less slick. For a treasure hunting game, increased finger pressure may cause the device to visually light up a larger area of the virtual world where treasure is hidden so the user may more easily determine its whereabouts.

Before concluding, again note that the device actions described above may be performed by a mobile device or a device of another type, including larger display devices.

Additionally, again note that the determinations and actions described above may be performed by two devices in conjunction with each other, such as a mobile device sensing finger pressure applied to its touch-enabled display and then transmitting the readout of the finger pressure to a remotely located server or nearby console that is executing the video game itself to stream it back to the mobile device for presentation. In such a situation, the server or console may take the game action or change the game in conformance with the identified pressure sensed at the mobile device and stream the altered game back to the mobile device for the user to play.

While the particular embodiments are herein shown and described in detail, it is to be understood that the subject matter which is encompassed by the present invention is limited only by the claims.

What is claimed is:

1. A system, comprising:
   at least one computer medium that is not a transitory signal and that comprises instructions executable by at least one processor to:
   identify a magnitude of touch input received at a touch-enabled display; and
   in conformance with the identified magnitude, present a video game character being played as part of a video game as having a particular emotion such that a first magnitude of touch input causes the video game character to visually demonstrate a first emotion and a second magnitude of touch input causes the video game character to visually demonstrate a second emotion different from the first emotion, the second magnitude being different from the first magnitude;
   wherein the first emotion is visually demonstrated through smiling and wherein the second emotion is visually demonstrated through laughter.

2. The system of claim 1, wherein the instructions are executable to:
   identify the magnitude of touch input based on an identified size of a display area encompassing the touch input.

3. The system of claim 1, wherein the instructions are executable to:
   identify the magnitude of touch input based on input from at least one pressure sensor accessible to the at least one processor.

4. The system of claim 3, comprising the at least one pressure sensor.

5. The system of claim 1, wherein the instructions are executable to:
   in conformance with the identified magnitude, change an attack mode for a video game character from the video game.

6. The system of claim 1, wherein the instructions are executable to:
   in conformance with the identified magnitude, change a weapon being used by a video game character from the video game.

7. The system of claim 1, wherein the instructions are executable to:
   in conformance with the identified magnitude, move the video game character such that a third magnitude of touch input causes the video game character to move at a first speed and a fourth magnitude of touch input causes the video game character to move at a second speed faster than the first speed, the fourth magnitude being greater than the third magnitude.

8. The system of claim 1, comprising the at least one processor.

9. The system 8, comprising the touch-enabled display.

10. The system of claim 1, wherein the system comprises a server, wherein the touch-enabled display is disposed on a device different from the server and with which the server communicates, and wherein the instructions are executable to:
    communicate, using the server, with the device to execute the video game in conformance with the identified magnitude.

11. The system of claim 1, wherein the instructions are executable to:
    based on the identified magnitude, identify at least one emotion of a person playing the video game; and
    based on the identification of the at least one emotion of the person playing the video game, change a difficulty level associated with execution of the video game.

* * * * *